(12) United States Patent
Gronbach

(10) Patent No.: US 6,396,720 B1
(45) Date of Patent: May 28, 2002

(54) METHOD AND DEVICE FOR CONTROLLING THE PARALLEL OPERATION OF DC CONVERTERS

(75) Inventor: Roman Gronbach, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/937,605

(22) PCT Filed: Jan. 24, 2001

(86) PCT No.: PCT/DE01/00269

§ 371 (c)(1),
(2), (4) Date: Sep. 26, 2001

(87) PCT Pub. No.: WO01/56130

PCT Pub. Date: Aug. 2, 2001

(30) Foreign Application Priority Data

Jan. 28, 2000 (DE) .......................................... 100 03 730

(51) Int. Cl.⁷ ............................................... H02M 7/00
(52) U.S. Cl. ......................................................... 363/72
(58) Field of Search ............................... 363/65, 71, 72; 307/82

(56) References Cited

U.S. PATENT DOCUMENTS 5,193,054 A * 3/1993 Galloway et al. ............. 363/72
6,009,000 A 12/1999 Siri
6,169,679 B1 * 1/2001 Deng et al. ................... 363/72

FOREIGN PATENT DOCUMENTS

| DE | 195 46 495 A | 6/1997 |
| DE | 198 05 926 | 12/1998 |
| DE | 199 330 39 | 6/1999 |
| DE | 198 05 926 A | 8/1999 |

* cited by examiner

Primary Examiner—Matthew Nguyen
(74) Attorney, Agent, or Firm—Michael J. Striker

(57) ABSTRACT

The invention concerns a method and a device for controlling the parallel operation of multiple d.c. voltage converters. One of these d.c. voltage converters performs a master function and works with voltage regulation. The other d.c. converters perform a slave function and serve as pure current sources. The d.c. voltage converter serving as the master with voltage regulation usually makes its half nominal current available during operation. It is therefore capable of rapidly correcting short-run load variations in the positive as well as the negative direction due to its control reserves.

10 Claims, 1 Drawing Sheet

METHOD AND DEVICE FOR CONTROLLING THE PARALLEL OPERATION OF DC CONVERTERS

RELATED ART

The invention concerns a method for controlling the parallel operation of multiple d.c. voltage converters having the features indicated in the preamble of Claim 1, as well as a device for controlling the parallel operation of multiple d.c. voltage converters having the features indicated in the preamble of Claim 7.

To improve the performance of d.c. voltage converters, multiple d.c. voltage converters can be connected in parallel and used in the sense of a master/slave operation. The d.c. voltage converter serving as master thereby takes over the voltage regulation in the total output-side system. The lower-order converter or converters, as current sources controlled by the master, help increase the output performance. In traditional systems, an additional cable connection is required to transfer the control commands between master and slave, by way of which analog, time-continuous current setpoints are transmitted to the slave converter or slave converters.

DE 195 46 495 A1 has already made known a circuit configuration and a method for an even distribution of electrical energy. Multiple static power converters are thereby operated as power supply units with rectifiers for supplying a common d.c. load. The power supply units are connected to each other by way of a bus system. When the system is operated, current is automatically distributed evenly.

Moreover, DE 198 05 926 A1 makes known a device and a method for the controlled parallel operation of d.c. voltage converters, in particular in a multi-voltage electric system of a vehicle. One of the converters thereby works in the active area, and the others work either in full-load operation or no-load operation.

Moreover, patent application DE 199 33 039 makes known a d.c. voltage converter, the control signal of which is created using a voltage regulator and a current regulator. A limiter is provided between the voltage regulator and the current regulator, which serves to limit the output signal of the voltage regulator. By specifying suitable values for a voltage setpoint and a limit value signal for the current setpoint, various operating modes can be achieved. These include a mode with controlled output voltage and a mode with controlled output current. The latter is particularly suited for a parallel operation of multiple d.c. voltage converters, whereby a higher-order d.c. voltage converter takes over the voltage regulation and only assigns the setpoint for the output current to be set to the other converters. The lower-order converters therefore work as current source.

ADVANTAGES OF THE INVENTION

The advantages of a method according to the invention and a device according to the invention are, in particular, that, due to the control strategy employed, the current distribution between the converters is optimized in terms of a control reserve that is as large as possible. Since the d.c. voltage converter working with voltage regulation and performing a master function is usually operated at its half nominal current, its half nominal current is available to it for reacting dynamically to short-run load variations in both the positive and negative directions.

This is an advantage in particular when a digital, time-discrete information transfer takes place between the d.c. voltage converters. Such an information transfer is subject to delays, so that the lower-order d.c. voltage converters working as current source are not immediately available. This can lead to control differences. Such control differences can be corrected rapidly by the d.c. voltage converter performing a master function, which has access to sufficient control reserves for short-run load variations in the positive direction as well as in the negative direction.

DRAWING

The invention is described in greater detail below for example purposes using the figures.

DESCRIPTION

Figure 1:
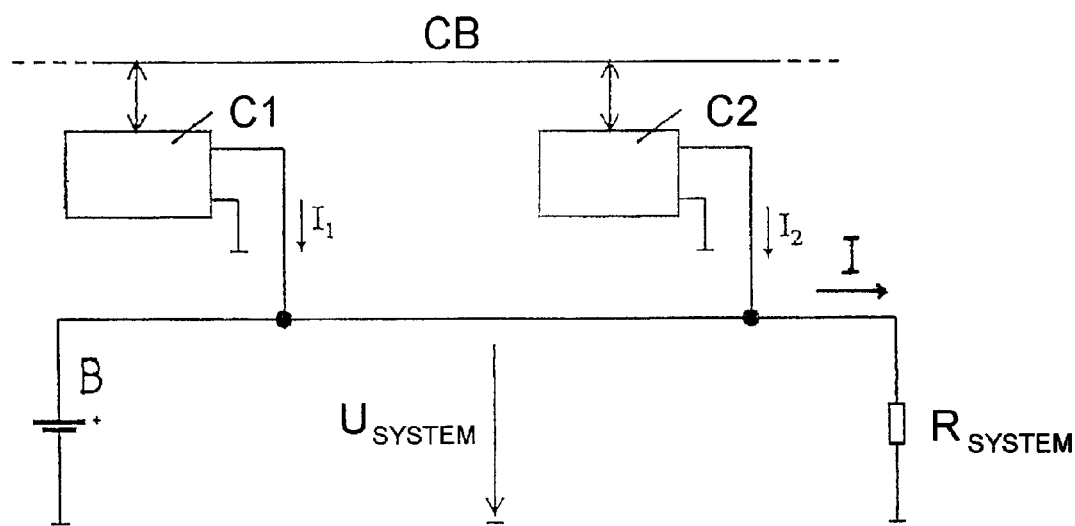
FIG. 1 shows a block diagram of a motor vehicle electric system in which a parallel connection of two d.c. voltage converters is provided to supply one load.

FIG. 1 shows a block diagram of a motor vehicle electric system in which a parallel connection of two d.c. voltage converters is provided to supply a load. The two d.c. voltage converters C1 and C2 are connected to each other by way of a CAN bus CB for the purpose of an information exchange. Moreover, the outputs of the two d.c. voltage converters are connected to each other. The task of d.c. voltage converters C1 and C2, which are connected to a power source not shown, consists of supplying energy to a load $R_{system}$ buffered by a battery B. A voltage $U_{system}$ can be tapped at the load $R_{system}$.

To prevent the occurrence of coupled modes, converter C2 performs a master function and works with voltage regulation. Converter C1, which has a slave function, serves only as current source. The information about the current setpoint $I_1$ to be supplied by it is fed by converter C2, which has a master function, to converter C1 by way of the CAN bus CB. The current made available by converter C2 to cover the existing current demand is represented by $I_2$. The calculation of the current setpoint for the lower-order converter C1 is carried out using the measured output currents $I_1$ and $I_2$ of the converters. The transfer of the measured output currents to the d.c. voltage converter C2 performing a master function is carried out by way of the CAN bus CB.

The device shown works as follows:

If the energy demand of the load $R_{system}$ is less than the half nominal current of the d.c. voltage converter C2 serving as master and working with voltage regulation, then converter C2 covers the entire current demand. In this case, converter C1 does not make a contribution to the power supply of the load.

If the total current demand of the load $R_{system}$ is greater than the half nominal current of the d.c. voltage converter C2 serving as master and working with voltage regulation, then converter C2 delivers its half nominal current. The remaining current demand is covered by the d.c. voltage converter C1 serving as current source.

If further slave d.c. voltage converters are provided parallel to converter C1, the remaining current demand is covered by all slave d.c. voltage converters, whereby all slave converters deliver equal shares of current. The calculation of these current shares takes place in converter C2 serving as master. The associated information transfer between the converters is carried out by way of the CAN bus CB. The calculation can also take place in the slave converters using the measured values of the master.

If the total current demand of the load $R_{system}$ is greater than the sum of the half nominal current of converter C2 and the nominal current of converter C1, the share of converter C2 of the total demand to be delivered increases above the half nominal current of converter C2.

If further slave d.c. voltage converters are provided parallel to converter C1, the current demand above and beyond the half nominal current of converter C2 is first covered by the slave converters until each of these delivers its nominal current. Only then does the share of converter C2 of total current to be supplied increase above the half nominal current of converter C2.

Figure 2:
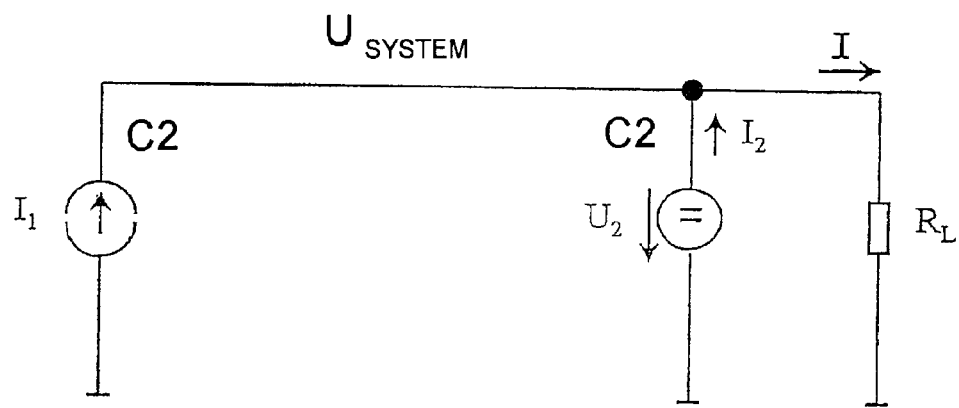
FIG. 2 shows an equivalent diagram of two converters in parallel operation.

FIG. 2 shows an equivalent diagram of two d.c. voltage converters C1 and C2 in parallel operation. Converter C2 works as voltage source, and converter C1 works as current source. By the stipulation of a current setpoint by converter C2 to converter C1, the current $I_1$ can be considered to be impressed in the system. The remaining current demand is then made available automatically by converter C2, whereby the stipulation of the current setpoint to converter C1 and the current to be delivered by converter C2 are determined with consideration for the control strategy described above in connection with FIG. 1.

What is claimed is:

1. Method for controlling the parallel operation of multiple d.c. voltage converters, in which one of the d.c. voltage converters performs a master function and at least one other d.c. voltage converter performs a slave function, whereby the d.c. voltage converter performing a master function works with voltage regulation, and the at least one other d.c. voltage converter works as current source, characterized in that the d.c. voltage converter with voltage regulation covers the total current demand when a total current demand is less than the half nominal current of the d.c. voltage converter with voltage regulation, and it delivers its half nominal current when a total current demand lies between the half nominal current and the nominal current of the d.c. voltage converter with voltage regulation, and the remaining current demand is covered by the d.c. voltage converters working as current source.

2. Method according to claim 1, characterized in that the d.c. voltage converter with voltage regulation serves to correct short-run load variations.

3. Method according to claim 1, characterized in that the remaining current demand is covered equally by the d.c. voltage converters working as current sources.

4. Method according to claim 1, characterized in that the communication between the d.c. voltage converter performing a master function and the d.c. voltage converters working as current sources takes place by way of a bus.

5. Method according to claim 4, characterized in that the bus is a CAN bus.

6. Method according to claim 1, characterized in that, in the case of a total current demand that is greater than the sum of the half nominal current of the d.c. voltage converter with voltage regulation and the total nominal current of the d.c. voltage converters working as current source, the d.c. voltage converter with voltage regulation delivers more than its half nominal current to cover the total current demand.

7. Device for controlling the parallel operation of multiple d.c. voltage converters, having a first d.c. voltage converter performing a master function that works with voltage regulation, at least one further d.c. voltage converter performing a slave function that is arranged parallel to the d.c. voltage converter performing a master function and works as current source, whereby the outputs of the d.c. voltage converters are connected to each other and to a load, characterized in that, in the case of a total current demand that is less than the half nominal current of the d.c. voltage converter with voltage regulation, the d.c. voltage converter performing a master function is provided to cover the total current demand, and in the case of a total current demand that lies between the half nominal current and the nominal current of the d.c. voltage converter with voltage regulation, the d.c. voltage converter performing a master function serves to deliver its nominal current, and the d.c. voltage converters performing a slave function serves to deliver the remaining current demand.

8. Device according to claim 7, characterized in that, in the case of a total current demand that is greater than the sum of the half nominal current of the d.c. voltage converter with voltage regulation and the total nominal current of the d.c. voltage converters working as current source, the d.c. voltage converter with voltage regulation serves to deliver more than its half nominal current.

9. Device according to claim 7, characterized in that it has a bus provided between the d.c. voltage converters.

10. Device according to claim 9, characterized in that the bus is a CAN bus.

* * * * *